US010108514B1

(12) United States Patent
Kinderman et al.

(10) Patent No.: US 10,108,514 B1
(45) Date of Patent: Oct. 23, 2018

(54) METHOD AND SYSTEM FOR PERFORMING REGRESSION SESSION ON A DEVICE UNDER TEST

(71) Applicant: CADENCE DESIGN SYSTEMS, INC., San Jose, CA (US)

(72) Inventors: Yael Kinderman, Givat Shmuel (IL); Ohad Givaty, Shoham (IL)

(73) Assignee: Cadence Design Systems, Inc., San Jose, CA (US)

( * ) Notice: Subject to any disclaimer, the term of this patent is extended or adjusted under 35 U.S.C. 154(b) by 159 days.

(21) Appl. No.: 15/254,038

(22) Filed: Sep. 1, 2016

(51) Int. Cl.
G06F 11/00 (2006.01)
G06F 11/22 (2006.01)
G06F 11/263 (2006.01)

(52) U.S. Cl.
CPC ........ *G06F 11/2273* (2013.01); *G06F 11/263* (2013.01)

(58) Field of Classification Search
CPC ........................... G06F 11/2273; G06F 11/263
See application file for complete search history.

(56) References Cited

U.S. PATENT DOCUMENTS

| 6,067,639 | A * | 5/2000 | Rodrigues | G06F 11/3688 714/38.11 |
| 9,489,290 | B1 * | 11/2016 | Boissy | G06F 11/3688 |
| 2005/0283664 | A1 * | 12/2005 | Coulter, Jr. | G06F 11/261 714/15 |
| 2008/0162992 | A1 * | 7/2008 | Lonowski | G01R 31/2894 714/25 |
| 2008/0320462 | A1 * | 12/2008 | Bergman | G06F 9/45512 717/168 |
| 2009/0265681 | A1 * | 10/2009 | Beto | G06F 11/3672 717/100 |
| 2015/0309918 | A1 * | 10/2015 | Raghavan | G06F 11/3688 714/38.1 |

* cited by examiner

Primary Examiner — Jason B Bryan
(74) Attorney, Agent, or Firm — Pearl Cohen Zedek Latzer Baratz LLP

(57) ABSTRACT

A method for performing a regression session when testing a device under test (DUT), may include a. obtaining a coverage model of the DUT, and a verification session input file (VSIF) relating to a plurality of tests to be run on the DUT, the VSIF including an initial number of runs associated with each of the tests of the plurality of tests; b. performing a first iteration of the regression session in which each of the tests of the plurality of tests is run the initial number of runs associated with that test; c. calculating for that iteration an effectiveness grade of each run of the tests of the plurality of tests, and assigning a weight to each of the runs of the tests of the plurality of tests corresponding to the calculated effectiveness grade of that test run; an d. Iteratively performing further iterations of the regression session in each of which each of the tests of the plurality of tests is run a number of runs corresponding to the weight assigned to that test run in a previous iteration; and calculating for that iteration a new effectiveness grade of each run of the tests of the plurality of tests, and assigning a new weight to each of the runs of the tests of the plurality of tests, wherein the new effectiveness grade and the new weight are used as the effectiveness grade and the weight, respectively, in a consecutive iteration of the iteratively performed further iterations.

20 Claims, 4 Drawing Sheets

| Run No. | Coverage Point 1 | Coverage Point 2 | Coverage Point 3 | Coverage Point 4 | Coverage Point 5 |
|---|---|---|---|---|---|
| 1 | X | | X | | |
| 2 | X | | | X | |
| 3 | X | | X | X | |
| 4 | | X | X | | X |
| 5 | X | X | X | | X |

Fig.2

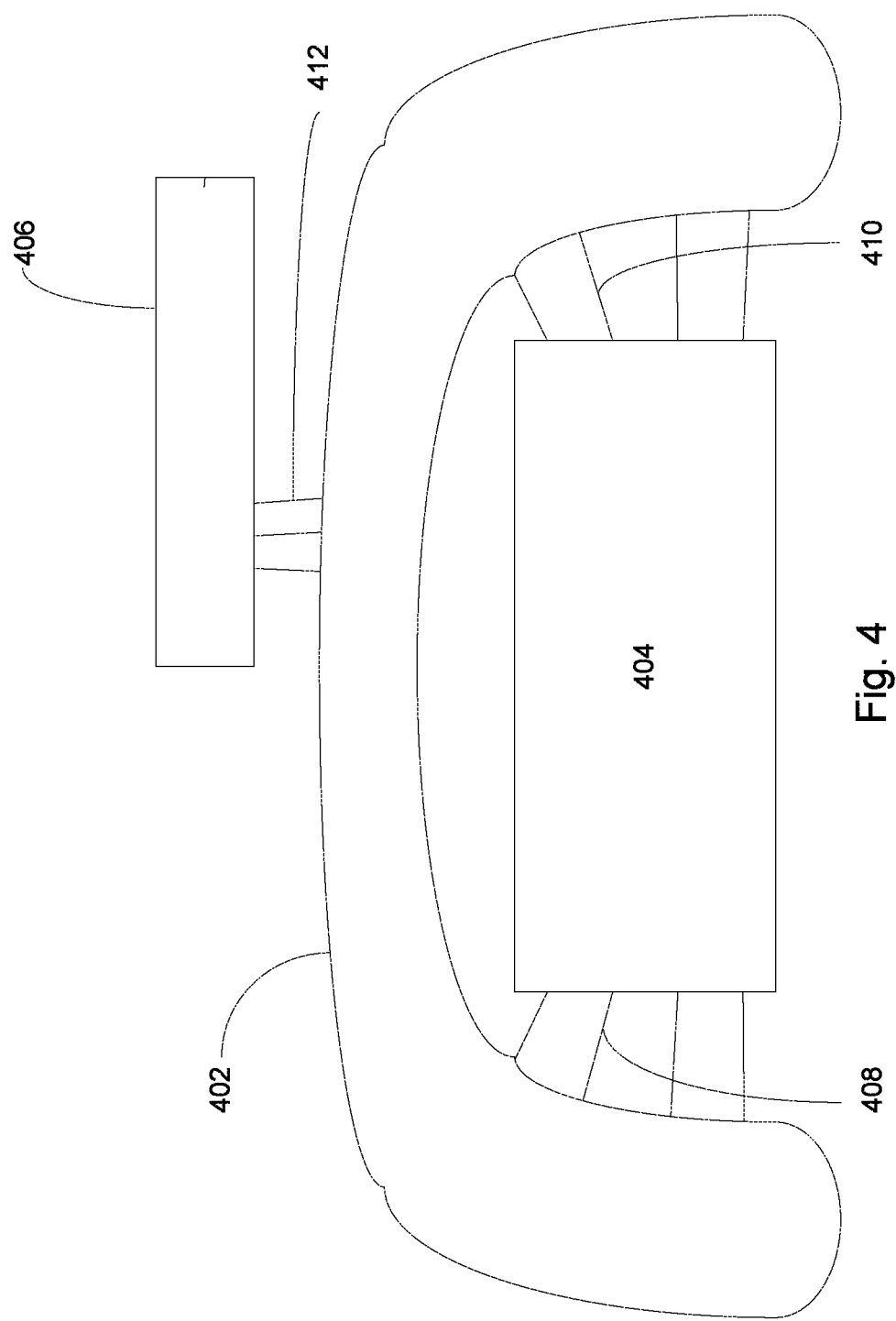

METHOD AND SYSTEM FOR PERFORMING REGRESSION SESSION ON A DEVICE UNDER TEST

FIELD OF THE INVENTION

The present disclosure relates to electronic design automation and more specifically to method and system for optimizing a regression session for verification of a device under test (DUT).

BACKGROUND OF THE INVENTION

Electronic Design Automation (EDA) tools are used in the process of designing and verifying new electronic systems (Devices Under Test—DUTs). Despite great advances in EDA scope and sophistication, many functional errors may still be found in the tested DUTs. In order to find such errors, every DUT typically requires more verification throughout the design cycle. Applying verification and maintaining a regression across the design flow is a most effective means of keeping continuous, interactive verification from slowing the design process.

Regression testing is used to verify that a simulated DUT performs correctly, usually after applying changes or interfacing it with another simulated device. In a regression session, a series of test runs (usually a large number of test runs) are run on the DUT, aiming at detecting failures (bugs) while covering as many coverage points as possible. The test runs typically are generated randomly based on a predefined test environment (the testbench) and one or more tests (containing mainly additional constraints) are run multiple times.

The success of a regression test in detecting bugs or covering coverage points is not linearly proportional to the number of times the test is run. In fact, over time, tests become less effective in achieving their tasks.

SUMMARY OF THE INVENTION

There is thus provided, in accordance with some embodiments of the present invention, a method for performing a regression session when testing a device under test (DUT). The method may include (a) obtaining a coverage model of the DUT, and a verification session input file (VSIF) relating to a plurality of tests to be run on the DUT, the VSIF including an initial number of runs associated with each of the tests of the plurality of tests; (b) performing a first iteration of the regression session in which each of the tests of the plurality of tests is run, with a random seed, the initial number of runs associated with that test; (c) calculating an effectiveness grade for each test of the plurality of tests, and assigning a weight to each test of the plurality of tests corresponding to the calculated effectiveness grade of that test; and (d) iteratively performing further iterations of the regression session in each of which each of the tests of the plurality of tests is run, with a random seed, a number of runs corresponding to the weight assigned to that test in a previous iteration; and calculating for that iteration a new effectiveness grade of each test of the plurality of tests, and assigning a new weight to each test of the plurality of tests, wherein the new effectiveness grade and the new weight are used as the effectiveness grade and the weight, respectively, in a consecutive iteration of the iteratively performed further iterations.

In some embodiments of the present invention, the initial number of runs may be user-defined.

In some embodiments, the initial number of runs may be the same for all of the tests of the plurality of tests.

In some embodiments of the invention, the coverage model is a partial coverage model.

In some embodiments of the invention, calculating of the effectiveness grade for each test may be based on a number of new bugs that were detected, a number of new coverage points that were sampled, or a combination thereof.

In some embodiments, the iteratively performing of the further iterations may be performed until one of the following conditions is met: a predetermined number of iterations is reached, a predetermined regression session time passes, a user halts the regression session, a certain percentage of coverage has been reached.

According to some embodiments, the effectiveness grade may be normalized.

In some embodiments, the effectiveness grade may be normalized based on an anticipated CPU time, simulation time, or a combination thereof.

There is also provided, in accordance with some embodiments of the invention, a system for performing a regression session when testing a device under test (DUT). The system may include: a memory and a processor, configured to: (a) obtain a coverage model of the DUT, and a verification session input file (VSIF) relating to a plurality of tests to be performed on the DUT, the VSIF including an initial number of runs associated with each of the tests of the plurality of tests; (b) perform a first iteration of the regression session in which each of the tests of the plurality of tests is run, with a random seed, the initial number of runs associated with that test; (c) calculate for that iteration an effectiveness grade of each test of the plurality of tests and assign a weight to each test of the plurality of tests corresponding to the calculated effectiveness grade of that test; and (d) iteratively perform a further iteration of the regression session in each of which each test of the plurality of tests is run, with a random seed, a number of runs corresponding to the weight assigned to that test in a previous iteration; and calculate for that iteration a new effectiveness grade for each test of the plurality of tests, and assign a new weight to each test of the plurality of tests, wherein the new effectiveness grade and the new weight are used as the effectiveness grade and the weight, respectively, in a consecutive iteration of the iteratively performed further iterations.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 2 is a table presenting a test and its corresponding coverage results achieved in a few runs that were executed in successive iterations that may be considered when determining the effectiveness of a test, according to some embodiments of the present invention.

FIG. 4 illustrates a simulated DUT, a corresponding testbench, and controller for controlling the performance of a regression session, according to some embodiments of the present invention.

Figure 1:
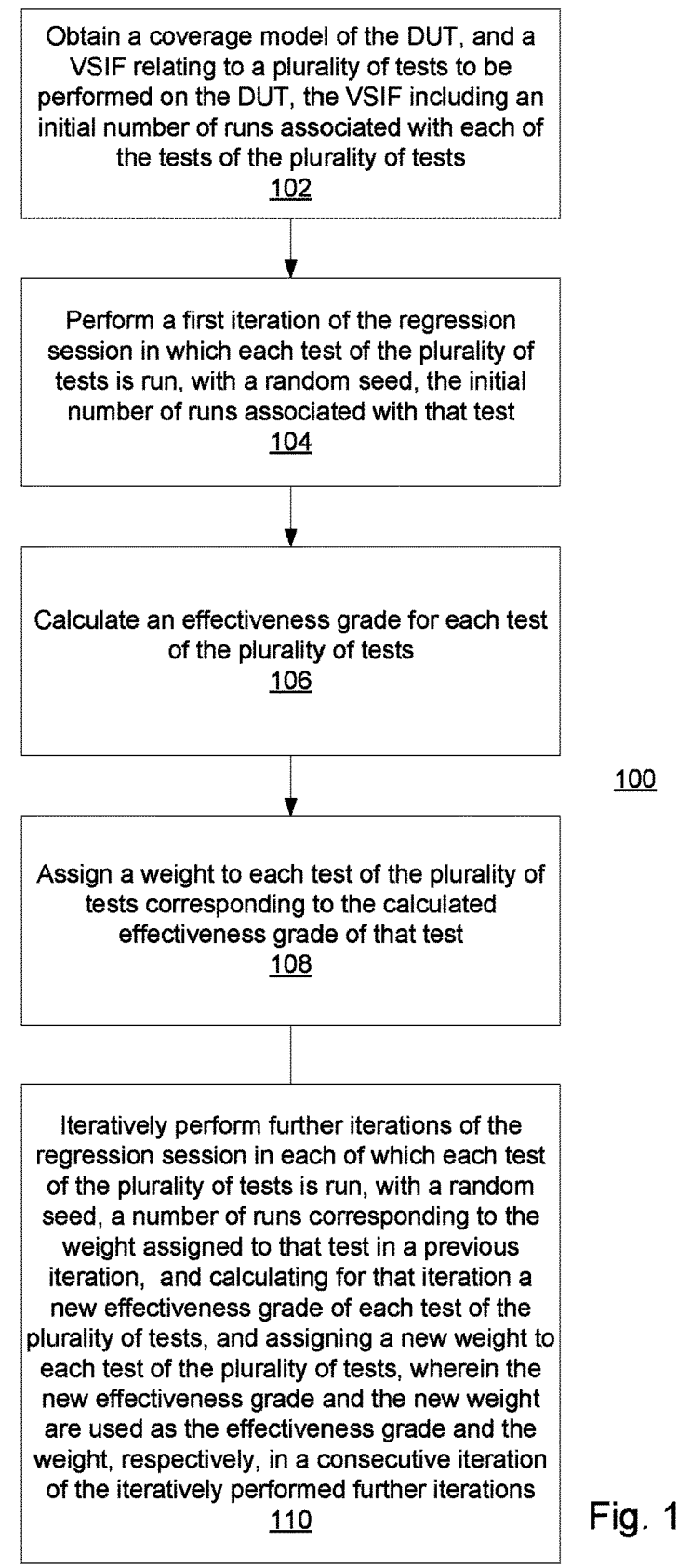
FIG. 1 illustrates a method for performing a regression session according to some embodiments of the present invention.

It will be appreciated that, for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Although the examples disclosed and discussed herein are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method examples described herein are not constrained to a particular order or sequence. Additionally, some of the described method examples or elements thereof can occur or be performed at the same point in time.

Unless specifically stated otherwise, as is apparent from the following discussions, it is appreciated that throughout the specification, discussions utilizing terms such as "adding", "associating" "selecting," "evaluating," "processing," "computing," "calculating," "determining," "designating," "allocating" or the like, refer to the actions and/or processes of a computer, computer processor or computing system, or similar electronic computing device, that manipulate, execute and/or transform data represented as physical, such as electronic, quantities within the computing system's registers and/or memories into other data similarly represented as physical quantities within the computing system's memories, registers or other such information storage, transmission or display devices.

When a regression session is conducted, it is usually desired to maximize the extent of coverage achieved by the regression test runs, and the amount of newly discovered bugs revealed by the regression. There are various types of coverage (code coverage, finite state machine—FSM, functional coverage—assertion coverage, cover groups, etc.) and tests are usually designed by a verification professional (hereinafter "user"), to address the specific coverage type. In a typical regression session, a batch of tests are executed (many times overnight), and each test is related to a specific environment and runs a predetermined number of times (in many cases, dozen times to several hundred times) with randomly varying seeds. The "user", in the context of the present specification, may be a single user or a plurality of users acting concurrently, or the same person, or different persons acting at different times.

Typically, a user has to decide, before the regression session starts, how many times each of the tests will be run. For example, the user may produce a Verification Session Input File (VSIF) in which the regression session is defined. The definition includes a list of tests and the number of times each test is to run. Typically, verification experts use many different VSIFs, each VSIF specifically designed to test specific feature or features of the DUT, aimed at various coverage points.

For example, the user may define a VSIF in which the first test (t1), would be run 50 times, the second test (t2) would be run 100 times, the third test (t3) would be run 300 times, etc. Typically the tests are using random seeds, aimed at generating random values within given constraints for the tests. This decision is based on the user's experience, who aims at selecting a greater number of runs to tests that appear to the user as more likely to successfully cover many coverage points, or that would require many runs to achieve that, and smaller number of runs to tests that the user expects to quickly cover the desired coverage points. However, the user's decision is in many cases a guess (a more educated guess at times, and a pure guess at other times), and may turn out to be a bad decision when reviewing the results after the regression session is over. In many cases, the user who defined the regression is not the one who wrote the tests, which also makes the task of defining the regression more complex. Automated process of defining the regression may have its advantages in such instances.

For example, it may well turn out that, after the first 20 runs of the first test, the rest of the runs did not substantially further contribute to additional coverage of coverage points, and perhaps the second test failed to reach a minimal coverage, while the third test reached full its full coverage target after 200 runs. Finding out this outcome at the end of a fully completed regression session may cause considerable waste of regression execution time and cause delays.

It may be desired to produce an efficient VSIF that would prevent wasting regression session time.

Thus, in accordance with some embodiments of the present invention, it is proposed, to produce a VSIF that assigns an initial number of runs to each of the tests that are designed to be executed in a specific regression session. The initial number of runs of each test is meant to be smaller than the anticipated or planned total number of runs for each of these tests. The regression session then starts by running each of the tests the initial number of times and checking the results of these runs to determine how efficient each of the test was in accomplishing a targeted coverage and finding new bugs. Next, each of the tests is automatically assigned a second number of runs to be executed, based on the initial results and determined efficiency of that test.

The method, according to some embodiments of the present invention, may be performed iteratively, wherein the regression session is divided into a plurality of iterations, where the number of runs of each of the prescribed tests of the regression session for a iteration is determined based on the efficiency of that test determined from one or a plurality of regression iterations of that regression session that were previously performed.

The initial number of runs per test ought preferably to be a number of runs that can result in obtaining a statistically meaningful result for that specific test. The initial number of runs may be selected by the user or predetermined otherwise. For example, the initial number of runs per a specific test, according to some embodiments of the present invention, may be determined in various ways, such as, by the verification engineers who are defining the regression session, selected arbitrarily, selected automatically, based on previous regression runs, etc.).

The efficiency of test runs may be determined based on one or a plurality of parameters. For many purposes, in accordance with some embodiments of the present invention, efficiency of tests may be determined based on the number of new bugs that were detected, based on the number of new coverage points that were sampled for each iteration compared to all pervious iterations, or based on a combination of some or all of the above. The efficiency of the test runs may be also based on other or additional factor or factors.

Some tests (directed tests) are specifically designed to test a specific coverage point; for example, it may be important to run a test with a specific value assigned to the test variable, because it relates to a rare condition that may occur, yet once that situation was tested there is no further need to continue running the test with that assigned value. Thus, when performing additional iterations of the regression session, that specific test is no longer needed and will, therefore, not be further performed. So, in the context of the present specification, the result of such a test hitting its designated target does not render that test "effective", as it is no longer required to run that test. The effectiveness of a test is thus determined not in terms of what the test runs achieved so far, but in terms of the prospects of future potential of the tests to cover new coverage points and/or to find new bugs. For example, it may be said that "effectiveness" of a test is the extent to which it has sampled new coverage points or caused new bugs to be found (or both) in the latest iteration, with respect to previous iterations.

If that test is still finding new bugs or covering new coverage points in the last iteration, it may probably have the potential to continue doing that in the future next one or more iterations, So, for many purposes, in accordance with some embodiments of the present invention, effectiveness grade is calculated for each test, and tests that are determined to be more effective (e.g., higher effectiveness grade) than others are assigned higher weights, and as a result are assigned a higher number of runs for the next iteration or iterations than tests whose effectiveness is determined to be lower. The greater the effectiveness grade of a test, the higher the weight for that test.

This also may mean that the weights assigned to a particular test increase or decrease as the regression session progresses. The more iterations are conducted, some tests may be dropped and not used in later iterations when it turns out that they are not efficient, or if their coverage target was fully achieved, or achieved to a predetermined or desired extent. Other tests that appear to be more effective may be selected for execution in a later iteration.

It is asserted that using a method for performing regression session according to some embodiments of the present invention requires no a priori knowledge of the effectiveness (or anticipated effectiveness) of each of the tests. In fact, in some embodiments of the present invention, all of the tests may be assigned the same initial number of runs for the first iteration, and as the regression progresses the weights of the tests will be re-evaluated, and newly calculated weights assigned to the tests as the regression session progresses.

FIG. 1 illustrates a method 100 for performing a regression session when testing a device under test (DUT), according to some embodiments of the present invention.

Method 100 may include:
a. obtaining 102 a coverage model of the DUT, and a verification session input file (VSIF) relating to a plurality of tests to be run on the DUT, the VSIF including an initial number of runs associated with each of the tests of the plurality of tests;

b. performing 104 a first iteration of the regression session in which each of the tests of the plurality of tests is run, with random seeds, the initial number of runs associated with that test;

c. calculating 106 for that iteration an effectiveness grade of each test of the plurality of tests; and assigning 108 a weight to each test of the plurality of tests corresponding to the calculated effectiveness grade of that test;

e. iteratively performing 110 a further iteration of the regression session in each of which each of the tests of the plurality of tests is run, with random seeds, a number of runs corresponding to the weight assigned to that test in a previous iteration; and calculating for that iteration a new effectiveness grade of each test of the plurality of tests, and assigning a new weight to each test of the plurality of tests, wherein the new effectiveness grade and the new weight are used as the effectiveness grade and the weight, respectively, in a consecutive iteration of the iteratively performed further iterations.

The coverage model may be, for example, a partial coverage model (e.g., vPlan—verification plan—file, or other coverage model representation form.

In some embodiments, the calculating of the effectiveness grade of each test is based on a number of new bugs that were detected, a number of new coverage points sampled, or a combination thereof.

In some embodiments, the regression session may come to a halt in one of a plurality of situations, such as, for example, a predetermined number of iterations is reached, a predetermined regression session time passes, a user manually halts the regression session, or a certain percentage of coverage has been reached.

In some embodiments, the effectiveness grade may be normalized. For example, the effectiveness grade may be normalized based on the "cost" of the test runs of a specific test. A test run cost may be a CPU time or simulation time that the test run consumes. When effectiveness grade is normalized, the more "costly" the test runs are in terms of consuming computing resources, the lower the test's effectiveness grade is.

Some embodiments are described hereinabove with reference to flowcharts and/or block diagrams depicting methods, systems and computer program products according to various embodiments.

FIG. 2 is a table presenting a test and its corresponding coverage results achieved in a few runs that were executed in successive iterations that may be considered when determining the effectiveness of a test, according to some embodiments of the present invention.

In the first run, the test successfully samples coverage point 1 and coverage point 3, of the 5 coverage points of a coverage model (e.g., vPlan) that was provided by the user. The second run of the test successfully samples coverage point 1 and coverage point 4; thus, although this test run too samples only two coverage points, the fact that 1 out of 5 coverage points in the model, sampled in the second run, is new relative to the first run makes the second run effective with respect to the first run. (Effectiveness can be considered 1/5, and the newly sampled coverage point is considered a "unique bin".)

Run 3 of the test has three hits (coverage point 1, coverage point 3 and coverage point 4), as opposed to two hits of the previous two runs, but all of these hits have been previously hit by the previous runs, which renders the third run ineffective with respect to the previous runs.

Run 4 has only two hits (coverage point 2 and coverage point 5), but both hits are unique (new hits), which renders this run 2/5 effective over the previous runs.

Finally, run 5 hits four coverage points (1, 2, 3 and 5) but all of them have been hit in previous runs, which makes this run ineffective. The weights assigned to the tests during each iteration may be calculated as the overall effectiveness of the entire number of runs of that test in a given iteration. This may be calculated, for example, by awarding marks to incremental addition each test run contributes with respect to previous runs of that test during previous iterations of the regression session. Thus, for example, run 4 of the test may be given a weight twice higher than run 2. Run 3 of the test may be given a weight of 0, given the lack of the additional coverage point hits.

In some embodiments of the present invention, when normalized effectiveness is calculated, and assuming run 4 is more costly than run 2, the weight of run 2 can be less than double compared to run 2, and in extreme cases, run 2 may get even a greater weight than run 4.

The calculated weights of each test are then used in determining the number of times each of these tests is to run in the following iteration. Different weights typically mean different number of times (the greater the weight the larger the number of runs).

According to some embodiments of the present invention, an effectiveness grade may be calculated for a specific test per a given iteration. A method for calculating such grade, for a specific test Ti in a test suite, may include:

1. finding a number of unique bins of coverage points that were sampled during the executions of test Ti at a specific iteration, but not in ant test run in previous iterations of that test;

2. finding a number of unique bugs that were found during the executions of test Ti at that specific iteration, but not in any test run in all previous iterations.

3. normalizing the two numbers with the resource usage (e.g., random access memory (RAM) and central processing unit (CPU) usage) by that test.

The distribution of the tests execution in the next iteration of the regression session (weights) is then determined based on the calculated effectiveness of each of the tests in the current iteration (which is related to previous iterations). In some embodiments of the invention, one or a plurality of tests that score effectiveness grade of zero may still be run, as statistically it may still be able to hit a new coverage item or detect a new bug.

In some embodiments of the present invention, a method of performing a regression session when testing a device under test (DUT) may include obtaining from the user a selection of one or a plurality of subsets of the coverage model (e.g., one or a plurality of subsets containing of coverage points of particular interest to the user). For example, the user may be prompted to select or define one or more subsets of coverage points of interest. Once entered or otherwise obtained, the regression focuses on the selected partial model only, as effectiveness grade is calculated only with respect to the coverage-points in partial model. Regression is running in a similar manner as described hereinabove. Thus, such method may include performing a first iteration of the regression session in which each of the tests of the plurality of tests is run, with a random seed, the initial number of runs associated with that test. The method may also include calculating an effectiveness grade for each test of the plurality of tests, and assigning a weight to each test of the plurality of tests corresponding to the calculated effectiveness grade of that test. The method may further include iteratively performing further iterations of the regression session in each of which each of the tests of the plurality of tests is run, with a random seed, a number of runs corresponding to the weight assigned to that test in a previous iteration; and calculating for that iteration a new effectiveness grade for each test of the tests of the plurality of tests, and assigning a new weight to each of the test of the plurality of tests, wherein the new effectiveness grade and the new weight are used as the effectiveness grade and the weight, respectively, in a consecutive iteration of the iteratively performed further iterations.

Applying this method on one or a plurality of subsets of the coverage model may offer the user the ability to focus on a particular part or parts of the tested DUT coverage model. For example, a DUT may include three blocks (A, B and C). Performing the method according to some embodiments of the invention on the entire design may result with the following coverage results: block A=20%, block B=35% and block C=20%, scoring an overall score of 25%. If the user selects to perform the regression runs on block A alone, this causes the method to prefer (that is, to rank higher) tests that better cover block A. This then leads to greater coverage score relating to block A (e.g., 55%), while scoring lower coverage for the other two blocks B and C (e.g., 10% and 8% respectively), scoring a lower overall score of 24.3%, but higher score on the desired, more interesting, block A.

The usage of a method for performing a regression session when testing a device under test (DUT), according to some embodiments of the present invention, on one or a plurality of subsets of the coverage model may be particularly of interest, for example, when running the regression on the entire design fails to cover certain subset of coverage points in that design. Applying the method on the subset causes the regression to focus on that certain subset, raising the chances of successfully covering these coverage points.

Another situation that seem fit for performing a regression session when testing a device under test (DUT), according to some embodiments of the present invention, on one or a plurality of subsets of the coverage model may be in the case when there has been a particular change (e.g., bug fix) in the design, during testing. In that case, it is advantageous to cause the regression to focus on the subset of coverage points where that relates to that change.

Figure 3:
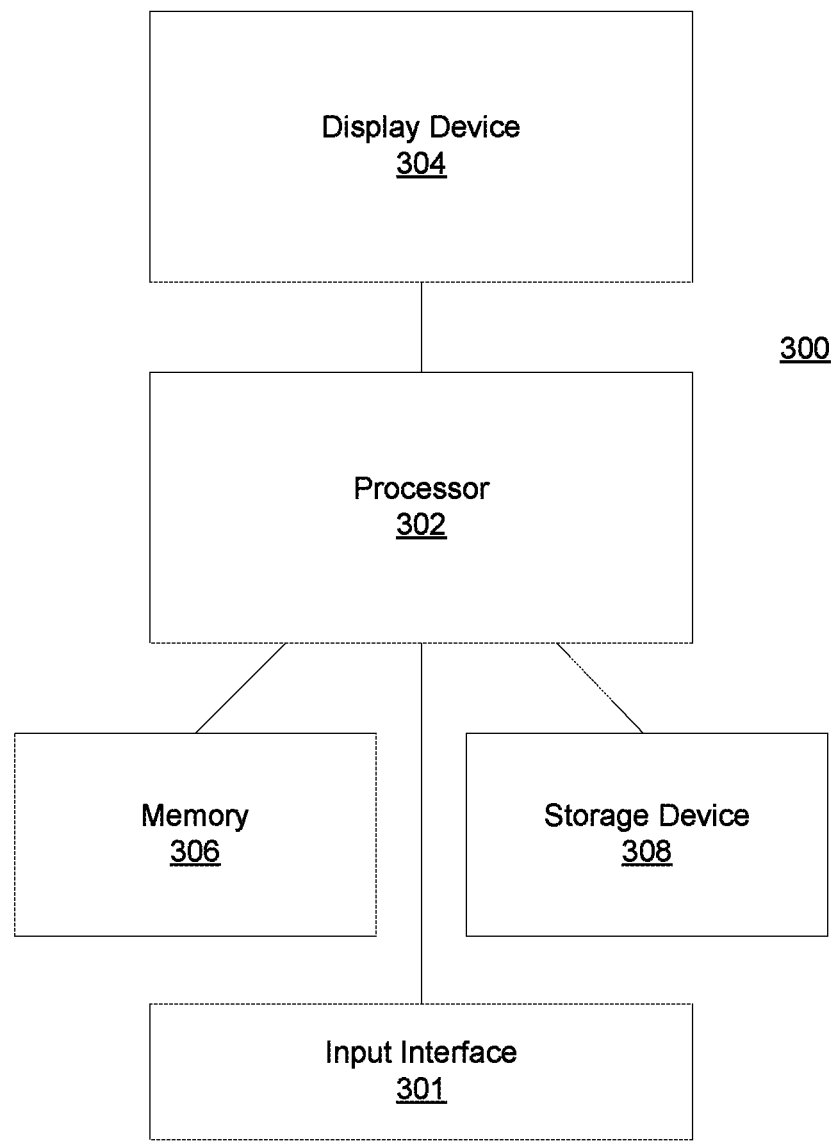
FIG. 3 illustrates a system for performing a regression session for verification of a DUT, according to some embodiments of the present invention.

FIG. 3 illustrates a system for performing a regression session for verification of a DUT, according to some embodiments of the present invention.

System 300 may include a processor 302 (e.g., one or a plurality of processors, on a single machine or distributed on a plurality of machines) for executing a method according to some embodiments of the present invention. Processor 302 may be linked with memory 306 on which a program implementing a method according to some embodiments of the present invention and corresponding data may be loaded and run from, and storage device 308, which includes a non-transitory computer readable medium (or mediums) such as, for example, one or a plurality of hard disks, flash memory devices, etc. on which a program implementing a method according to some embodiments of the present invention and corresponding data may be stored. System 300 may further include an output device 304 (e.g., display device such as CRT, LCD, LED, etc.) on which one or a plurality user interfaces associated with a program implementing a method according to some embodiments and corresponding data may be presented. System 300 may also include input interface 301, such as, for example, one or a plurality of keyboards, pointing devices, touch sensitive surfaces (e.g., touch sensitive screens), etc. for allowing a user to input commands and data.

FIG. 4 illustrates a simulated DUT 404, a corresponding testbench 402, and controller 406 for controlling the performance of a regression session, according to some embodiments of the present invention.

Testbench 402 is designed to input test stimuli into DUT 404 via inputs 408, and obtain outputs from DUT 404, via outputs 410. Controller 406 is used to control testbench 402, by governing a method for performing a regression session on the DUT, according to some embodiments of the present invention, such as, for example, according to the embodiments described hereinabove. A user may intervene by inputting commands and/or data via a user interface (see, for example, FIG. 3).

Some embodiments of the present invention may be embodied in the form of a system, a method or a computer program product. Similarly, some embodiments may be embodied as hardware, software or a combination of both. Some embodiments may be embodied as a computer program product saved on one or more non-transitory computer readable medium (or media) in the form of computer readable program code embodied thereon. Such non-transitory computer readable medium may include instructions that when executed cause a processor to execute method steps in accordance with examples. In some examples the instructions stores on the computer readable medium may be in the form of an installed application and in the form of an installation package.

Such instructions may be, for example, loaded by one or more processors and get executed.

For example, the computer readable medium may be a non-transitory computer readable storage medium. A non-transitory computer readable storage medium may be, for example, an electronic, optical, magnetic, electromagnetic, infrared, or semiconductor system, apparatus, or device, or any combination thereof.

Computer program code may be written in any suitable programming language. The program code may execute on a single computer system, or on a plurality of computer systems.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A method for performing a regression session when testing an electronic system device under test (DUT), the method comprising:
   using a processor:
   a. obtaining a coverage model of the DUT, and a verification session input file (VSIF) relating to each test of a plurality of tests to be run on the DUT, the VSIF including an initial number of runs associated with each test of the plurality of tests;
   b. performing a first iteration of the regression session in which each test of the plurality of tests is run, with a random seed, the initial number of runs associated with said each test;
   c. calculating an effectiveness grade for each test of the plurality of tests, the calculating including determining a number of coverage points of the coverage model that are covered by each run of said each test and comparing the determined number with the number of coverage points that were covered in runs of said each test previous to said each run, and assigning a weight to each test of the plurality of tests corresponding to the calculated effectiveness grade of said each test;
   d. iteratively performing further iterations of the regression session in each of which each of the tests of the plurality of tests is run, with a random seed, a number of runs corresponding to the weight assigned to that test in a previous iteration; and calculating for each iteration of the further iterations a new effectiveness grade for each test of the tests of the plurality of tests, and assigning a new weight to each of the test of the plurality of tests, wherein the new effectiveness grade and the new weight are used as the effectiveness grade and the weight, respectively, in a consecutive iteration of the iteratively performed further iterations.

2. The method of claim 1, wherein the initial number of runs is user-defined.

3. The method of claim 1, wherein the initial number of runs is the same for all of the tests of the plurality of tests.

4. The method of claim 1, wherein the coverage model is a partial coverage model.

5. The method of claim 1, wherein the calculating of the effectiveness grade for each tests is based on a number of new bugs that were detected, a number of new coverage points that were sampled, or a combination thereof.

6. The method of claim 1, wherein the iteratively performing of the further iterations is performed until one of the following conditions is met: a predetermined number of iterations is reached, a predetermined regression session time passes, a user halts the regression session, a certain percentage of coverage has been reached.

7. The method of claim 1, wherein the effectiveness grade is normalized.

8. The method of claim 7, wherein the effectiveness grade is normalized based on an anticipated CPU time, simulation time, or a combination thereof.

9. A system for performing a regression session when testing an electronic system device under test (DUT), the system comprising:
   a memory and
   a processor, configured to:
   a. obtain a coverage model of the DUT, and a verification session input file (VSIF) relating to each test of a plurality of tests to be run on the DUT, the VSIF including an initial number of runs associated with each test of the plurality of tests;
   b. perform a first iteration of the regression session in which each test of the plurality of tests is run, with a random seed, the initial number of runs associated with said each test;
   c. calculate for the first iteration an effectiveness grade of each test of the plurality of tests, the calculation including determining a number of coverage points of the coverage model that are covered by each run of said each test and comparing the determined number with the number of coverage points that were covered in runs of said each test previous to said each run, and assign a weight to each of the tests of the plurality of tests corresponding to the calculated effectiveness grade of said each test;
   d. iteratively perform a further iteration of the regression session in each of which each of the tests of the plurality of tests is run, with a random seed, a number of runs corresponding to the weight assigned to that test in a previous iteration; and calculate for the further iteration a new effectiveness grade for each test of the plurality of tests, and assigning a new weight to each of the runs of the tests of the plurality of tests, wherein the new effectiveness grade and the new weight are used as the effectiveness grade and the weight, respectively, in a consecutive iteration of the iteratively performed further iterations.

10. The system of claim 9, wherein the system includes an input device to allow a user to input the initial number of runs.

11. The system of claim 9, wherein the initial number of runs is the same for all of the tests of the plurality of tests.

12. The system of claim 9, wherein the coverage model is a partial model.

13. The system of claim 9, wherein the processor is configured to calculate the effectiveness grade of each test based on a number of bugs that were detected, a number of new coverage points sampled for each iteration, or a combination thereof.

14. The system of claim 9, wherein the processor is configured to iteratively perform the further iterations until one of the following conditions is met: a predetermined number of iterations is reached, a predetermined regression session time passes, a user halts the regression session, a certain percentage of coverage has been reached.

15. The system of claim 9, wherein the processor is configured to normalize the effectiveness grade.

16. The system of claim 15, wherein the effectiveness grade is normalized based on an anticipated CPU time, simulation time, or a combination thereof.

17. A non-transitory computer readable storage medium for performing a regression session on an electronic system DUT, having stored thereon instructions that when executed by a processor will cause the processor to:
  a. obtain a coverage model of the DUT, and a verification session input file (VSIF) relating to each test of a plurality of tests to be run on the DUT, the VSIF including an initial number of runs associated with each test of the plurality of tests;
  b. perform a first iteration of the regression session in which each test of the plurality of tests is run, with a random seed, the initial number of runs associated with said each test;
  c. calculate an effectiveness grade of each test of the plurality of tests, the calculation including determining a number of coverage points of the coverage model that are covered by each run of said each test and comparing the determined number with the number of coverage points that were covered in runs of said each test previous to said each run, and assign a weight to each of runs of the tests of the plurality of tests corresponding to the calculated effectiveness grade of said each test;
  d. iteratively perform further iterations of the regression session in each of which each of the tests of the plurality of tests is run a number of runs corresponding to the weight assigned to that test in a previous iteration; and calculate for each iteration of said further iterations a new effectiveness grade of each test of the plurality of tests, and assigning a new weight to each of the runs of the tests of the plurality of tests, wherein the new effectiveness grade and the new weight are used as the effectiveness grade and the weight, respectively, in a consecutive iteration of the iteratively performed further iterations.

18. The non-transitory computer readable storage medium of claim 17, wherein the initial number of runs is user-defined.

19. The non-transitory computer readable storage medium of claim 17, wherein the initial number of runs is the same for all of the tests of the plurality of tests.

20. The non-transitory computer readable storage medium of claim 17, wherein the calculating of the effectiveness grade of each test is based on a number of new bugs that were detected, a number of new coverage points sampled for each iteration, or a combination thereof.

* * * * *